United States Patent
Makii et al.

(10) Patent No.: US 7,885,016 B2
(45) Date of Patent: Feb. 8, 2011

(54) LIGHT QUANTITY ADJUSTING DEVICE, LENS BARREL AND IMAGE PICKUP APPARATUS

(75) Inventors: Tatsuo Makii, Tokyo (JP); Naoyuki Ohno, Tokyo (JP)

(73) Assignee: Sony Corporation, Tokyo (JP)

( * ) Notice: Subject to any disclaimer, the term of this patent is extended or adjusted under 35 U.S.C. 154(b) by 109 days.

(21) Appl. No.: 12/423,134

(22) Filed: Apr. 14, 2009

(65) Prior Publication Data

US 2009/0296183 A1    Dec. 3, 2009

(30) Foreign Application Priority Data

May 29, 2008    (JP)    ............................. 2008-140598

(51) Int. Cl.
G02B 5/20    (2006.01)
(52) U.S. Cl. ...................................... 359/739
(58) Field of Classification Search ................. 359/227, 359/738, 739; 353/75, 97; 396/505, 510, 396/449
See application file for complete search history.

(56) References Cited

U.S. PATENT DOCUMENTS 6,771,315 B1 * 8/2004 Nanjo et al. ................. 348/362

FOREIGN PATENT DOCUMENTS

| JP | 8-6105 | 1/1996 |
|---|---|---|
| JP | 2000-122109 | 4/2000 |
| JP | 2006-308820 | 11/2006 |
| WO | WO 2008/032519 A1 | 3/2008 |

* cited by examiner

*Primary Examiner*—Joseph Martinez
(74) *Attorney, Agent, or Firm*—Oblon, Spivak, McClelland, Maier & Neustadt, L.L.P.

(57) ABSTRACT

Disclosed herein is a light quantity adjusting device including: first and second diaphragm blades shiftably provided to adjust a size of a diaphragm aperture; a neutral density filter blade provided shiftably in the same direction as the first and second diaphragm blades and having a neutral density filter adapted to cover the diaphragm aperture to reduce a quantity of light passing through the diaphragm aperture; and a drive mechanism adapted to shift the first and second blades and the neutral density filter blade; wherein the drive mechanism is configured to include an actuator, a first cam groove, a second cam groove, a third cam groove, an arm, a first cam-pin, and a second cam-pin.

6 Claims, 13 Drawing Sheets

LIGHT QUANTITY ADJUSTING DEVICE, LENS BARREL AND IMAGE PICKUP APPARATUS

BACKGROUND OF THE INVENTION

1. Field of the Invention

The present invention relates to a light quantity adjusting device, a lens barrel and an image pickup apparatus.

2. Description of the Related Art

A lens barrel of an image pickup apparatus such as a video camera or a digital still camera is frequently provided with a light quantity adjusting device (a diaphragm device) which adjusts the size of a diaphragm aperture whose center is located on the optical axis of an image pickup optical system incorporated in the lens barrel.

If only a pair of diaphragm blades is used to provide a small aperture state, diffraction deterioration will occur. To prevent the diffraction deterioration, light quantity adjusting devices are provided that use the pair of diaphragm blades in combination with an ND (neutral density) filter blade adapted to reduce the quantity of transmitted light.

One of such light quantity adjusting devices is proposed in which a single actuator drives the pair of diaphragm blades and the ND filter blade. See Japanese Patent Laid-open No. Hei 8-6105.

In addition, another one is proposed in which two independent actuators drive the pair of diaphragm blades and the ND filter blade. See Japanese Patent Laid-open No. 2000-122109.

SUMMARY OF THE INVENTION

However, the former light quantity adjusting device has a difference between the shifting direction of the pair of diaphragm blades and that of the ND filter blades, which is disadvantageous to reduce an occupancy space. In addition, it is assumed that the former light quantity adjusting device is used in the so-called halfway-covered state where the ND filter partially covers a diaphragm aperture defined by the pair of diaphragm blades. Therefore, the diaphragm aperture halfway closed by the ND filter causes diffraction deterioration and the end face of the ND filter causes unnecessary reflected light. Thus, there is a limit to improve resolution capability.

On the other hand, the latter light quantity adjusting device is such that the two actuators independently shift the pair of actuators and the ND filter blade. Therefore, although the halfway-covered state of the ND filter can be avoided, the provision of the two actuators is disadvantageous to reduce the occupancy space.

It is desirable to provide a light quantity adjusting device, a lens barrel and an image pickup apparatus that are advantageous to improvement of image quality as well as to downsizing.

According to an embodiment of the present invention, there is provided a light quantity adjusting device including: first and second diaphragm blades shiftably provided to adjust a size of a diaphragm aperture; an ND filter blade provided shiftably in the same direction as the first and second diaphragm blades and having an ND filter adapted to cover the diaphragm aperture to reduce a quantity of light passing through the diaphragm aperture; and a drive mechanism adapted to shift the first and second blades and the ND filter blade; wherein the drive mechanism is configured to include an actuator, a first cam groove formed in the first diaphragm blade, a second cam groove formed in the second diaphragm blade, a third cam groove formed in the ND filter blade, an arm pivoted by the actuator, a first cam-pin provided on the arm so as to project therefrom and engage both the first and third cam grooves, and a second cam-pin provided on the arm so as to project therefrom and engage the second cam groove, and wherein the first, second and third cam grooves are formed such that the arm is pivoted to shift, via the first and second cam-pins, the first and second diaphragm blades oppositely to each other to adjust the size of the diaphragm aperture and such that in a state where the aperture diaphragm is formed at a predetermined size, the ND filter blade is shifted between a use position where the ND filter covers the diaphragm aperture and a withdrawal position where the ND filter is withdrawn from the diaphragm aperture.

According to another embodiment of the present invention, there is provided a lens barrel equipped with a light quantity adjusting device, the light quantity adjusting device including: first and second diaphragm blades shiftably provided to adjust a size of a diaphragm aperture; an ND filter blade provided shiftably in the same direction as the first and second diaphragm blades and having an ND filter adapted to cover the diaphragm aperture to reduce a quantity of light passing through the diaphragm aperture; and a drive mechanism adapted to shift the first and second blades and the ND filter blade; wherein the drive mechanism is configured to include an actuator, a first cam groove formed in the first diaphragm blade, a second cam groove formed in the second diaphragm blade, a third cam groove formed in the ND filter blade, an arm pivoted by the actuator, a first cam-pin provided on the arm so as to project therefrom and engage both the first and third cam grooves, and a second cam-pin provided on the arm to project therefrom and engage the second cam groove, and wherein the first, second and third cam grooves are formed such that the arm is pivoted to shift, via the first and second cam-pins, the first and second diaphragm blades oppositely to each other to adjust the size of the diaphragm aperture and such that in a state where the aperture diaphragm is formed at a predetermined size, the ND filter blade is shifted between a use position where the ND filter covers the diaphragm aperture and a withdrawal position where the ND filter is withdrawn from the diaphragm aperture.

According to another embodiment of the present invention, there is provided an image pickup apparatus equipped with a light quantity adjusting device, the light quantity adjusting device including: first and second diaphragm blades shiftably provided to adjust a size of a diaphragm aperture; an ND filter blade provided shiftably in the same direction as the first and second diaphragm blades and having an ND filter adapted to cover the diaphragm aperture to reduce a quantity of light passing through the diaphragm aperture; and a drive mechanism adapted to shift the first and second blades and the ND filter blade; and wherein the drive mechanism is configured to include an actuator, a first cam groove formed in the first diaphragm blade, a second cam groove formed in the second diaphragm blade, a third cam groove formed in the ND filter blade, an arm pivoted by the actuator, a first cam-pin provided on the arm so as to project therefrom and engage both the first and third cam grooves, and a second cam-pin provided on the arm so as to project therefrom and engage the second cam groove, and wherein the first, second and third cam grooves are formed such that the arm is pivoted to shift, via the first and second cam-pins, the first and second diaphragm blades oppositely to each other to adjust the size of the diaphragm aperture and such that in a state where the aperture diaphragm is formed at a predetermined size, the ND filter blade is shifted between a use position where the ND filter covers the diaphragm aperture and a withdrawal position where the ND filter is withdrawn from the diaphragm aperture.

According to the embodiments of the present invention, the shifting direction of the first and second diaphragm blades is the same as that of the ND filter blade and the first and second diaphragm filter blades are shifted by the common actuator.

This is advantageous to reduce the occupancy space of the light quantity adjusting device, and thus to downsize and thin the lens barrel and the image pickup apparatus.

Since the ND filter blade is shifted between the use position and the withdrawal position in the state where the diaphragm aperture is formed at the predetermined size, the halfway-covered state where the ND filter partially covers the diaphragm aperture is not present. This is advantageous to improve resolution capability.

DETAILED DESCRIPTION OF THE PREFERRED EMBODIMENTS (Image Pickup Apparatus 10)

Preferred embodiments of the present invention will be described with reference to the drawings.

Figure 1:
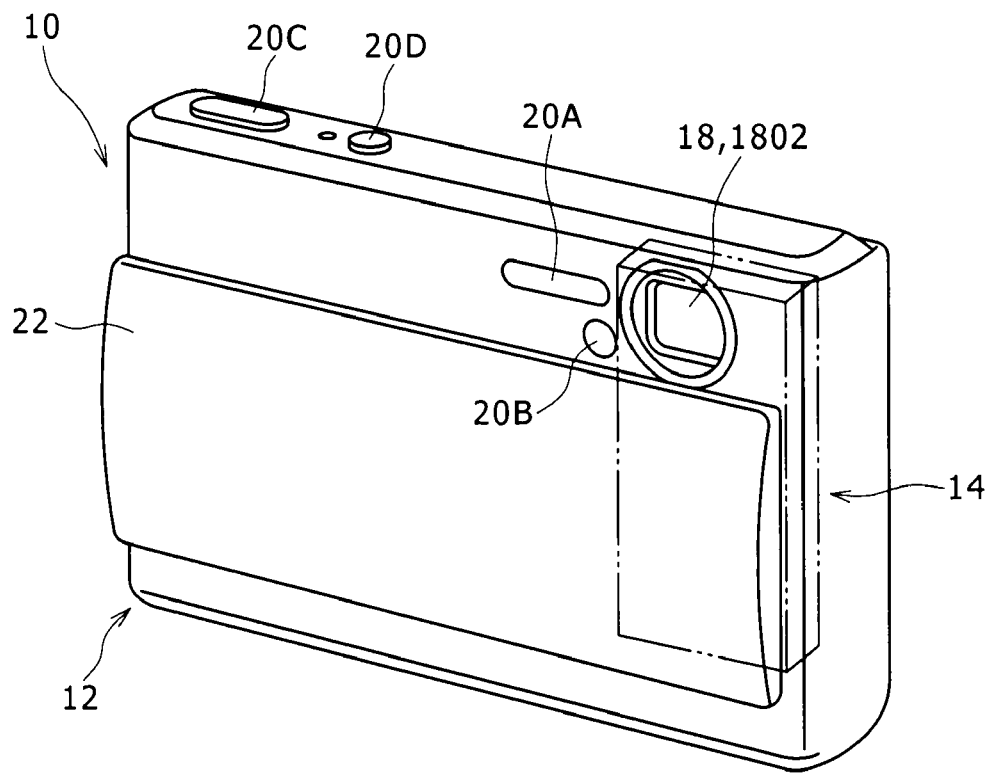
FIG. 1 is a perspective view of an image pickup apparatus of an embodiment.
Figure 2:
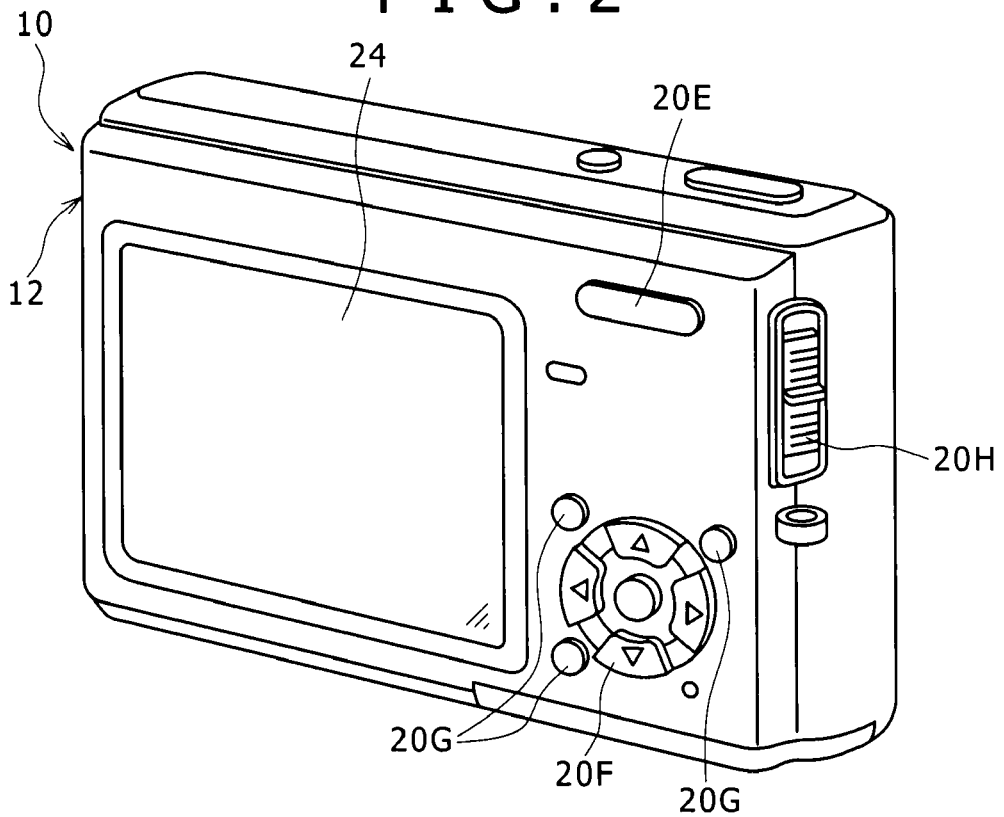
FIG. 2 is a perspective view of the image pickup apparatus as viewed from the rear thereof.

FIG. 1 is a perspective view of an image pickup apparatus 10 according to an embodiment. FIG. 2 is a perspective view of the image pickup apparatus 10 as viewed from the rear thereof.

The image pickup apparatus 10 is a digital still camera as illustrated in FIGS. 1 and 2.

The image pickup apparatus 10 includes a rectangular plate-like casing 12 constituting an exterior.

It is to be noted that, in this specification, the terms "front" and "rear" represent a subject side and the side opposite to the subject side, respectively, and the terms "left" and "right" are based on the image pickup apparatus viewed from the front.

A lens barrel 14 is incorporated in the right portion of the casing 12 as indicated with a two-dot chain line in the figure.

Figure 4:
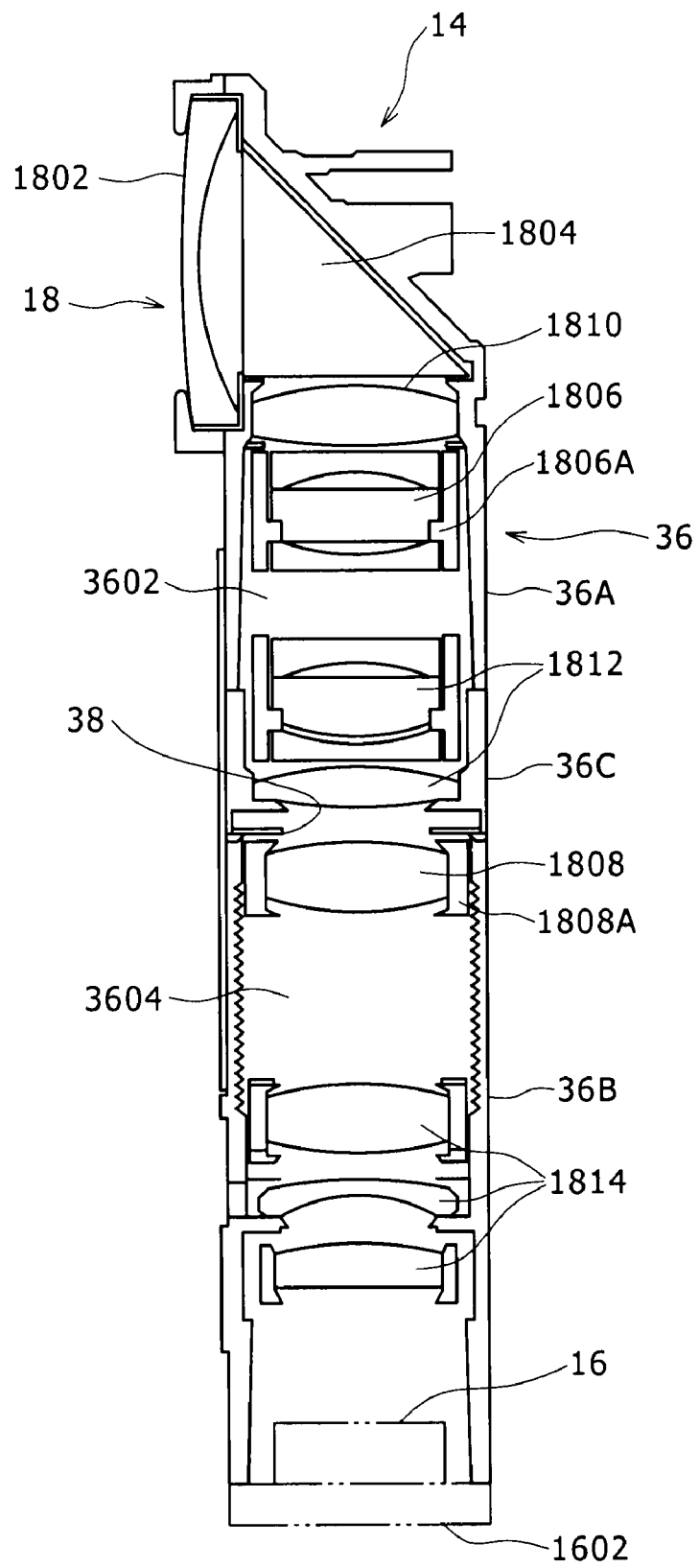
FIG. 4 is a cross-sectional view taken along line X-X of FIG. 3.

The lens barrel 14 is provided with an image pickup optical system 18 adapted to lead a subject image to an image pickup element 16 (FIG. 4).

An object lens 1802 located at the front most of the image pickup optical system 18 is disposed to face the front of the casing 12 via a lens window provided in the front face of the casing 12.

A flash 20A adapted to emit photographing-assist light and a self-timer lamp 20B are provided on the front face of the casing 12 at a position a little to the right.

A cover 22 is provided on the front face of the casing 12 so as to be slidable upward and downward. This cover 22 is slid between a lower limit position where the object lens 1802, the flash 20A and the self-timer lamp 20B are exposed to the front and an upper limit position where they are covered thereby.

A shutter button 20C and a power source button 20D are provided on the upper surface of the casing 12 at a position a little to the left.

A display (a liquid crystal display device) 24 on which an image such as a still image or moving images, characters, etc. are displayed, a zoom switch 20E used to perform the zooming operation of the image pickup system 18, a cross-shape switch 20F adapted to perform various operations, and a plurality of operation buttons 20G are provided on the rear face of the casing 12.

A mode switch 20H is provided on the left lateral surface of the casing 12 to selectively bring the image pickup device 10 into a still image shooting mode, a moving image shooting mode, a reproduction/edit mode or other modes.

Figure 5:
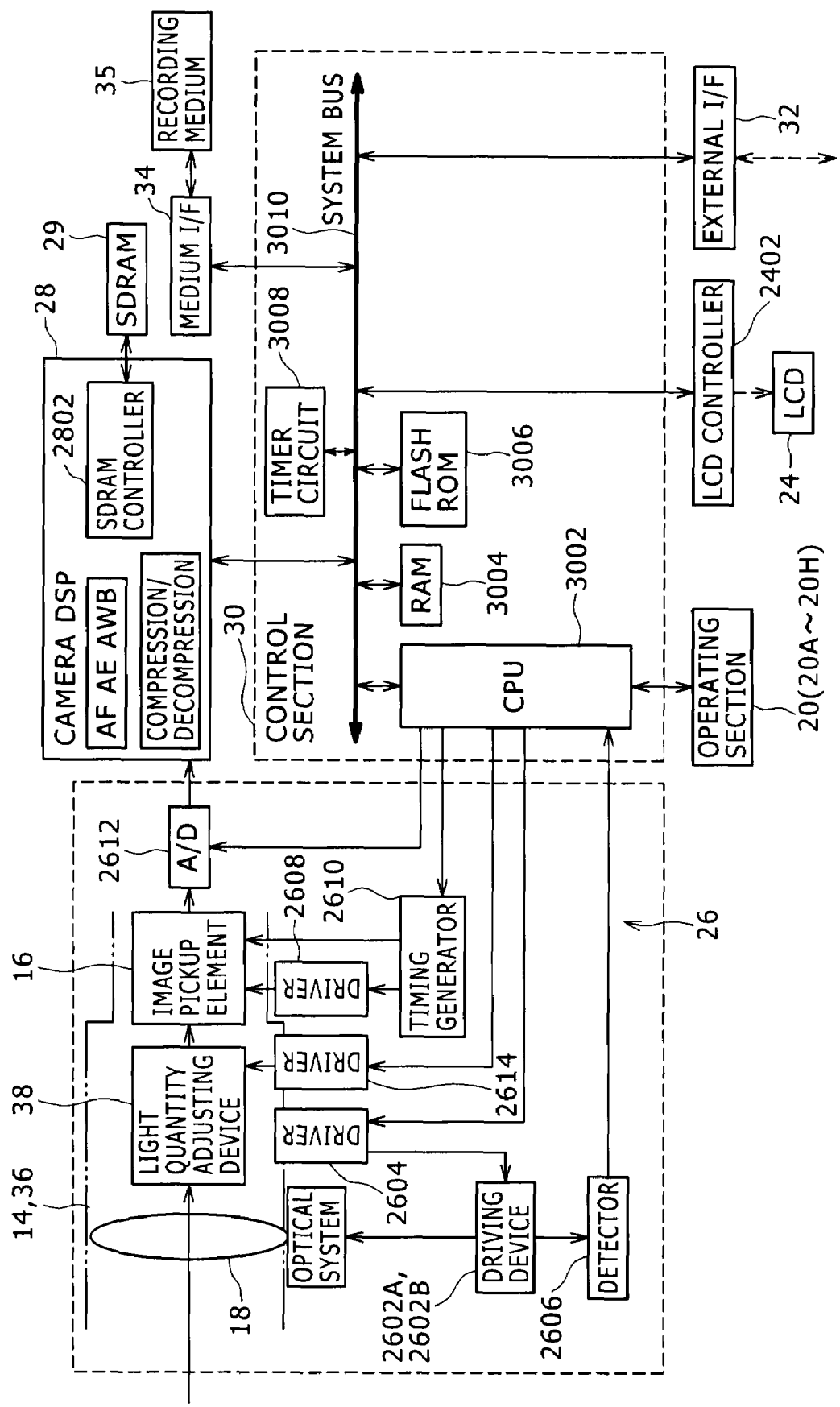
FIG. 5 is a block diagram illustrating a configuration of the image pickup apparatus.

These switches 20A through 20H constitute an operating section 20 (FIG. 5).

(Lens Barrel 14)

Figure 3:
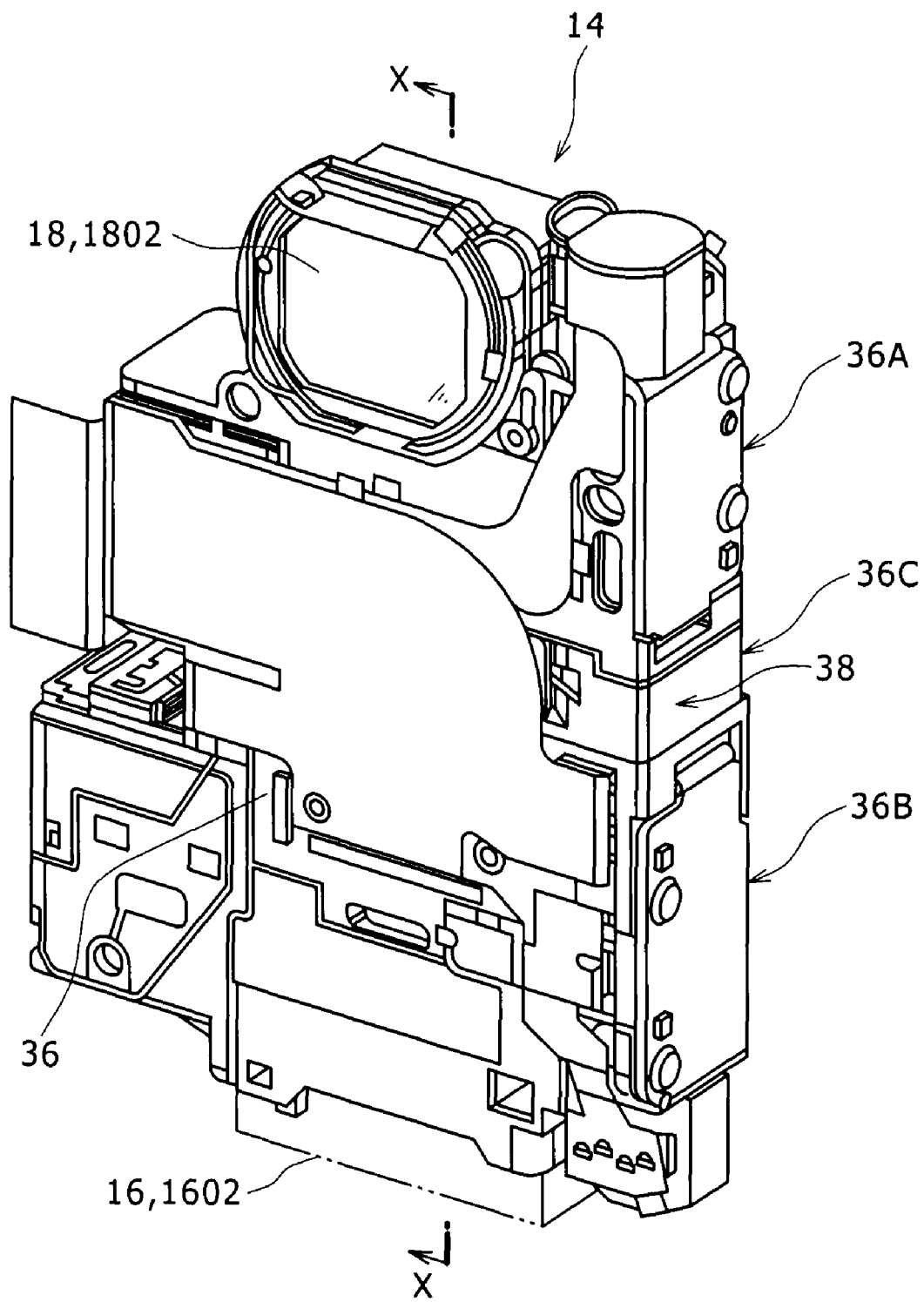
FIG. 3 is a perspective view of a lens barrel.

FIG. 3 is a perspective view of the lens barrel 14 and FIG. 4 is a cross-sectional view taken along line X-X of FIG. 3.

Referring to FIGS. 3 and 4, the lens barrel 14 includes a barrel 36, an image pickup element 16, an image pickup optical system 18 and a light quantity adjusting device 38 according to the embodiment of the present invention.

The image pickup element 16 is composed of a CCD (charge-coupled device) or a CMOS (complementary metal-oxide-semiconductor) sensor adapted to pick up a subject image focused by the image pickup optical system 18.

The image pickup optical system 18 is configured to include an object lens 1802, a prism 1804, a zooming movable lens group 1806, a focusing movable lens group 1808, a first fixed lens group 1810, a second fixed lens group 1812, and a third fixed lens group 1814.

The lens barrel 14 further includes a zooming driving device 2602A (FIG. 5) and a focusing driving device 2602B (FIG. 5).

(Barrel 36)

The barrel 36 is wholly formed like a flat plate having width, length and thickness. The image pickup element 16 and the image pickup optical system 18 are disposed at the widthwise central portion of the barrel 36 so as to align with each other in the longitudinal direction of the barrel 36.

The barrel 36 is composed of a first barrel divided body 36A and a second barrel divided body 36B that are divided in the longitudinal direction thereof and a third barrel divided body 36C put between the first and second barrel divided bodies 36A, 36B.

(First Barrel Divided Body 36A)

The first barrel divided body 36A is internally provided with a downward opening upper component-accommodating space 3602. The object lens 1802 is attached to a front face of the first barrel divided body 36A at a widthwise central upper portion.

The prism 1804 is adapted to reflect downward (toward the image pickup element 16) an image captured by the object lens 1802 and uses a prism in the present embodiment. The prism 1804 is disposed in the upper component-accommodating space 3602 at a position opposed to the object lens 1802.

The first fixed lens group 1810 and the zooming movable lens group 1806 are disposed in the upper component-accommodating space 3602 and below the prism 1804 in this order.

(Zooming Movable Lens Group 1806)

The zooming movable lens group 1806 is supported by a zooming lens frame 1806A.

The zooming movable lens group 1806 is configured such that it is supported by a guide mechanism not shown via the zooming lens frame 1806A so as to be movable in the optical-axial direction of the image pickup optical system 18 and it is moved in the optical-axial direction of the image pickup system 18 by a zooming driving device 2602A (FIG. 5).

The guide mechanism is configured to include a bearing hole provided in the zooming lens frame 1806A and a guide shaft inserted into the bearing hole. Traditionally known guide mechanisms are adoptable as such a guide mechanism.

The zooming driving device 2602A is configured to include a female screw member connected to the zooming lens frame 1806A; a male screw member threadedly engaged with the female screw member; and a motor for rotatably driving the male screw member. Traditionally known guide members are adoptable as such a driving device.

(Third Barrel Divided Body 36C)

The third barrel divided body 36C includes an inner portion opposed to the inside of the upper component-accommodating space 3602 and an outer portion located outside the upper component-accommodating space 3602.

The second fixed lens group 1812 is attached to the inner portion in such a manner that its optical axis is coincident with that of the zooming movable lens group 1806.

The light quantity adjusting device 38 is provided behind the second fixed lens 1812, that is, forward of the image pickup element 16 on the optical axis of the image pickup optical system 18.

(Second Barrel Divided Body 36B)

The second barrel divided body 36B is internally formed with a vertically opening lower component-accommodating space 3604. The image pickup device 16 is attached to the lower portion of the second barrel divided body 36B via a holder 1602 to close the lower end of the lower component-accommodating space 3604.

The focusing movable lens group 1808 and the third fixed lens group 1814 are arranged inside the lower component-accommodating space 3604 at a widthwise central position of the second barrel divided body 36B.

(Focusing Movable Lens Group 1808)

The focusing movable lens group 1808 is supported by a focusing lens frame 1808A.

The focusing movable lens group 1808 is configured such that it is supported by a guide mechanism not shown via the focusing lens frame 1808A so as to be movable in the optical-axial direction of the image pickup system 18 and to be moved in the optical-axial direction of the image pickup system 18 by the focusing driving device 2602B (FIG. 5).

The guide mechanism is configured to include a bearing hole provided in the focusing lens frame 1808A and a guide shaft inserted into the bearing hole. Traditionally known guide mechanisms are adoptable as such a guide mechanism.

The focusing driving device 2602B is configured to include a female screw member connected to the focusing lens frame 1808A; a male screw member threadedly engaged with the female screw member; and a motor for rotatably driving the male screw member. Traditionally known guide members are adoptable as such a driving device.

(Third Fixed Lens Group 1814)

The third fixed lens group 1814 is disposed in the lower component-accommodating space 3604 below the focusing movable lens group 1808.

(Control System)

FIG. 5 is a block diagram illustrating the configuration of the image pickup device 10.

The image pickup apparatus 10 includes a drive section 26, a signal processing section 28, a control section 30, an operating section 20, an external interface 32 and a medium interface 34 as well as the lens barrel 14 and display 24 described earlier.

The drive section 26 includes a driver 2604, a detector 2606, a driver 2608, a timing generator 2610, an A/D converter 2612 and a driver 2614 as well as the zooming driving device 2602A and the focusing driving device 2602B described earlier.

The driver 2604 is adapted to supply a drive signal to the zooming driving device 2602A and to the focusing driving device 2602B.

The detector 2606 is adapted to detect the travel distances of the movable lens groups 1806 and 1808 moved by the zooming driving device 2602A and the focusing driving device 2602B, respectively.

The driver 2608 is adapted to supply a drive signal to the image pickup element 16.

The timing generator 2610 is adapted to supply a timing signal to the image pickup element 16 and to the driver 2608.

The A/D converter 2612 A/D subjects the image pickup signal generated by the image pickup element 16 to A/D conversion.

The driver 2614 supplies a drive signal to the light quantity adjusting device 38.

The signal processing section 28 performs predetermined signal processing on an image-pickup signal supplied from the A/D converter 2612 for generating image data and performing various operations related to photographing (autofocus operation, automatic exposure operation, automatic white balance operation, compression and decompression of image data, etc.). The signal processing section 28 is composed of e.g. DSP.

The signal processing section 28 uses a memory (SDRAM) 29 via a SDRAM controller 2802 as a working area for image data processing.

The control section 30 includes a CPU 3002, a RAM 3004, a flash ROM 3006, a timer circuit 3008 and a system bus 3010 connecting them together.

The CPU 3002 is operated based on a control program stored in the flash ROM 3006.

The CPU 3002 exchanges data with the RAM 3004, the flash ROM 3006, and the timer circuit 3008 via the system bus 3010. In addition, the CPU 3002 operates in response to an operation instruction supplied from the operating section 20 and to a detection signal supplied from the detector 2606. Further, the CPU 3002 exercises control on the drivers 2604, 2614, timing generator 2610 and A/D converter 2612 of the driving section 26.

The CPU 3002 exchanges via a medium interface 34 data containing image data with a recording medium 35 such as an embedded memory or a memory card.

The CPU 3002 displays image data, etc. on the display 24 via the LCD controller 2402.

The CPU 3002 exchanges data containing image data with the external device (a personal computer or a printer) via the external interface 32.

(Light Quantity Adjusting Device 38)

A detailed description is next given of the light quantity adjusting device 38 which is a gist of the present invention.

Figure 6:
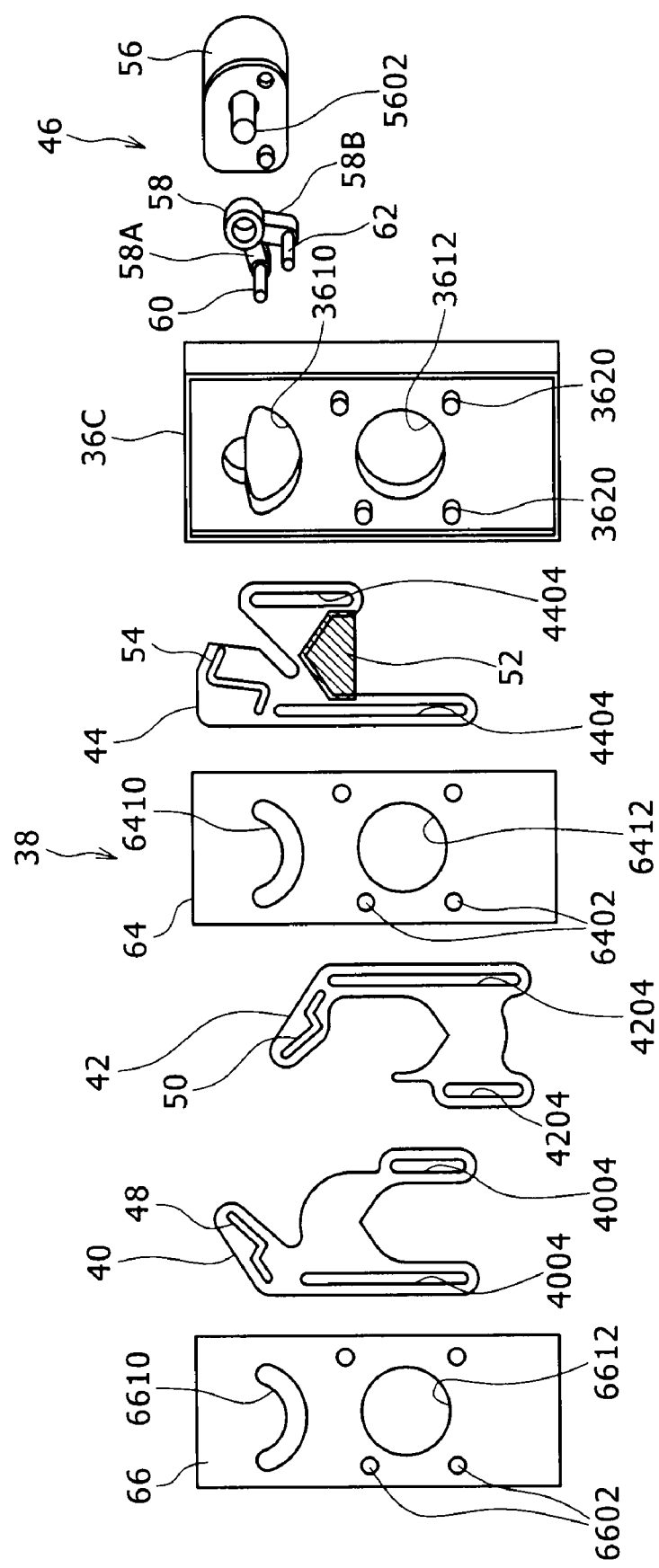
FIG. 6 is an exploded view illustrating a configuration of a light quantity adjusting device.

FIG. 6 is an exploded view illustrating a configuration of the light quantity adjusting device 38.

Figure 7:
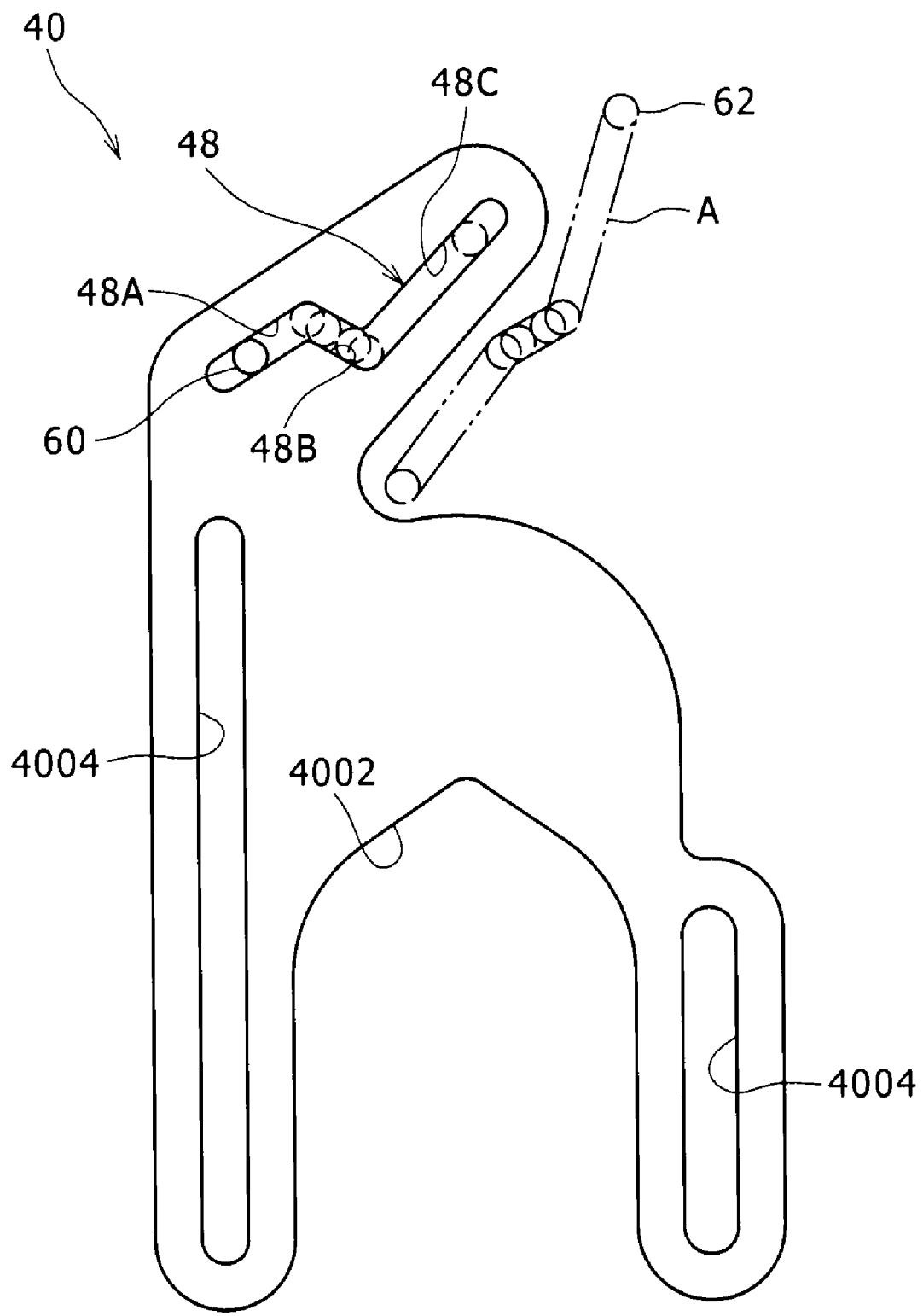
FIG. 7 is a plan view of a first diaphragm blade.
Figure 8:
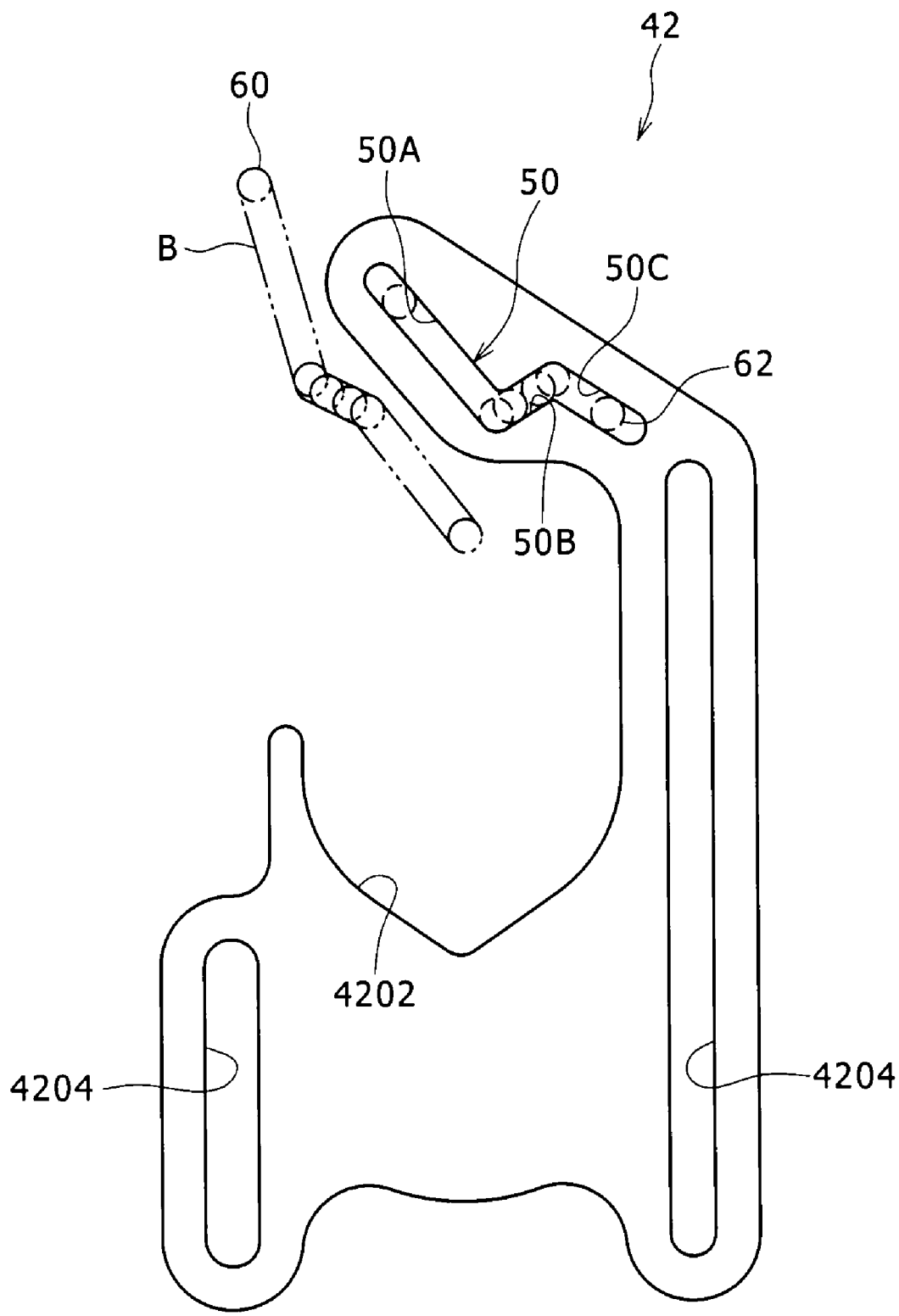
FIG. 8 is a plan view of a second diaphragm blade.
Figure 9:
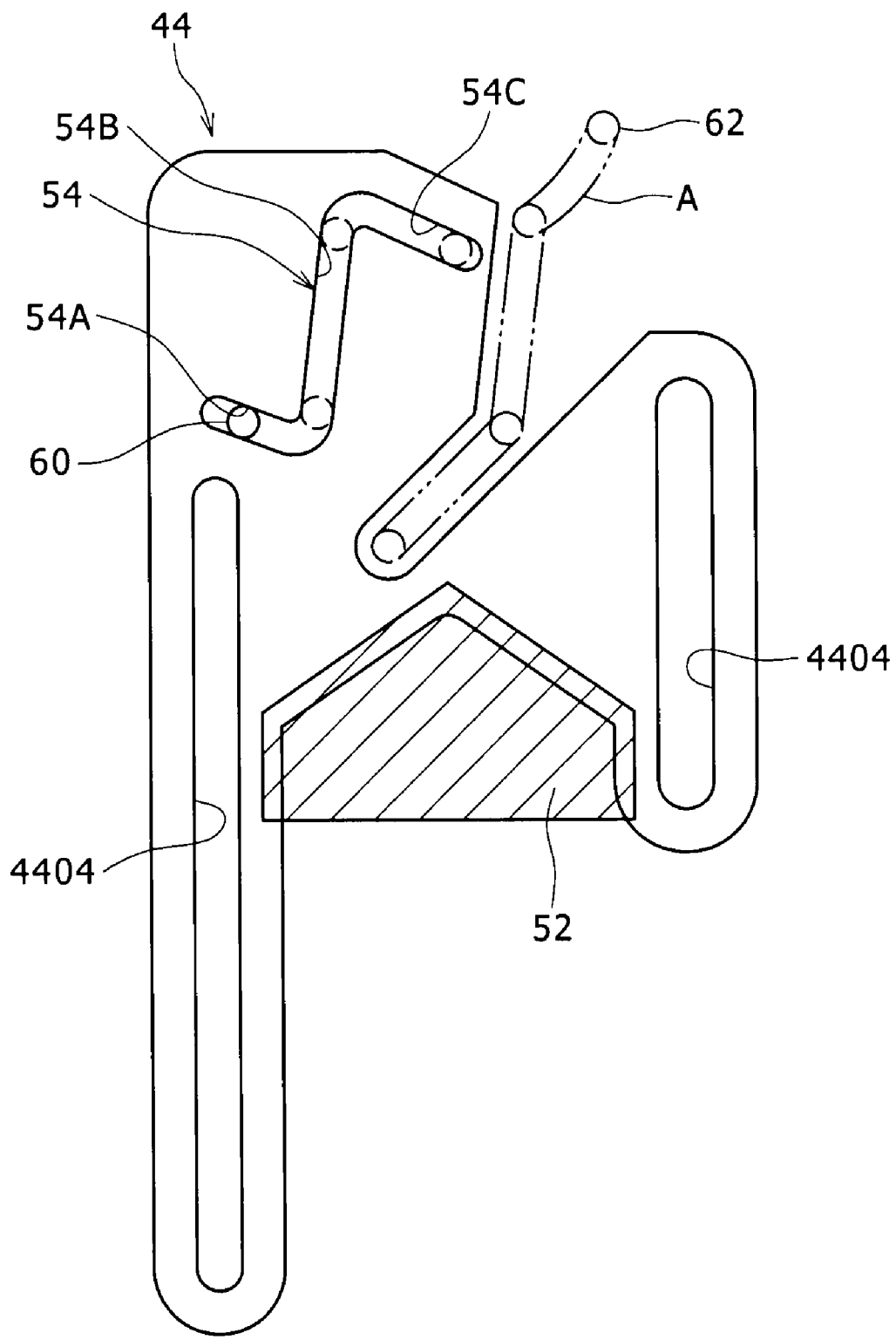
FIG. 9 is a plan view of an ND filter blade.

FIG. 7 is a plan view of a first diaphragm blade 40. FIG. 8 is a plan view of a second diaphragm blade 42. FIG. 9 is a plan view of a third diaphragm blade 44.

Figure 10:
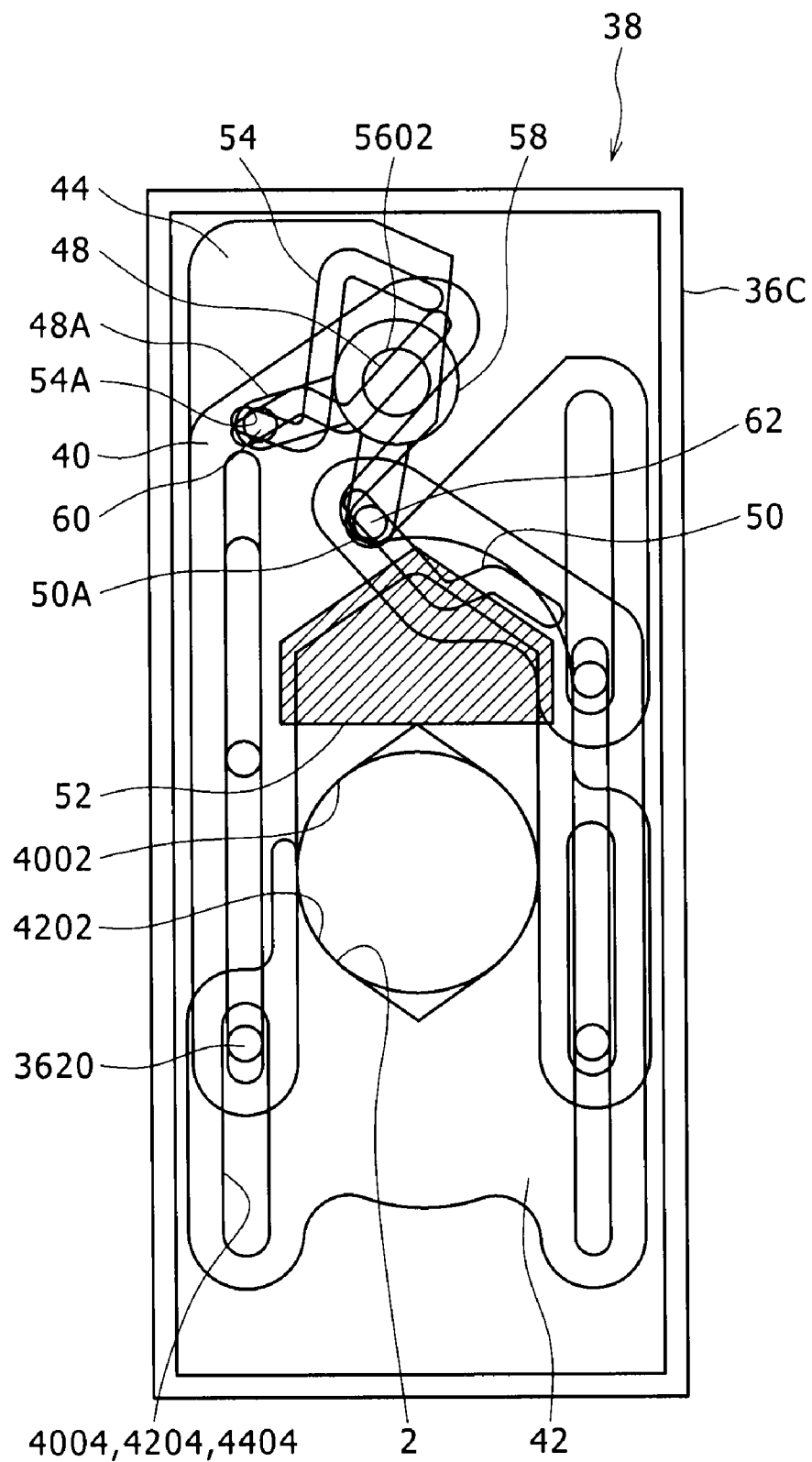
FIG. 10 is a plan view of the light quantity adjusting device in which the diaphragm aperture is opened and the ND filter is located at a withdrawal position.
Figure 11:
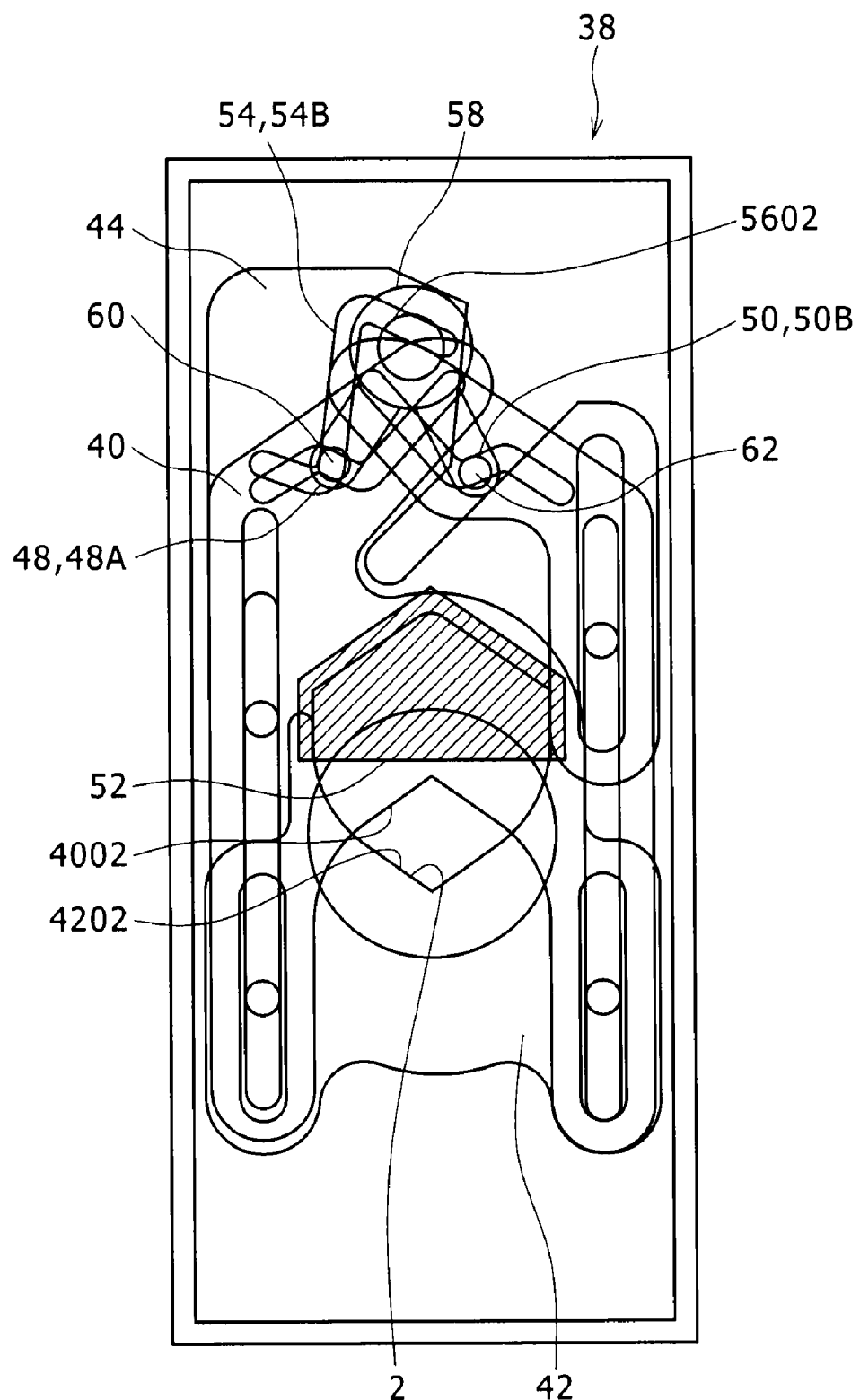
FIG. 11 is a plan view of the light quantity adjusting device in which the diaphragm aperture is halfway closed and the ND filter blade is located at the withdrawal position.
Figure 12:
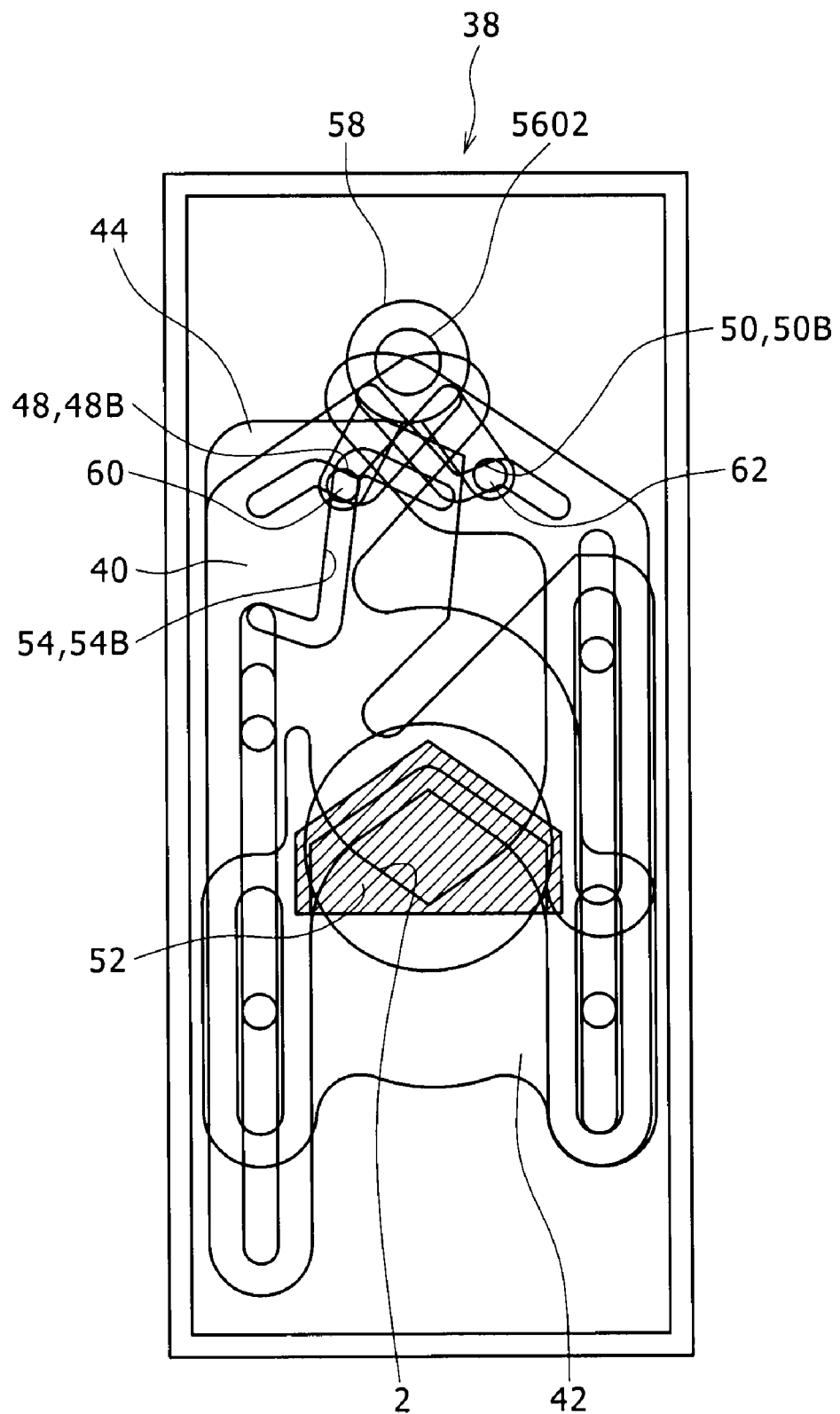
FIG. 12 is a plan view of the light quantity adjusting device in which the diaphragm aperture is halfway closed and the ND filter blade is located at a use position.
Figure 13:
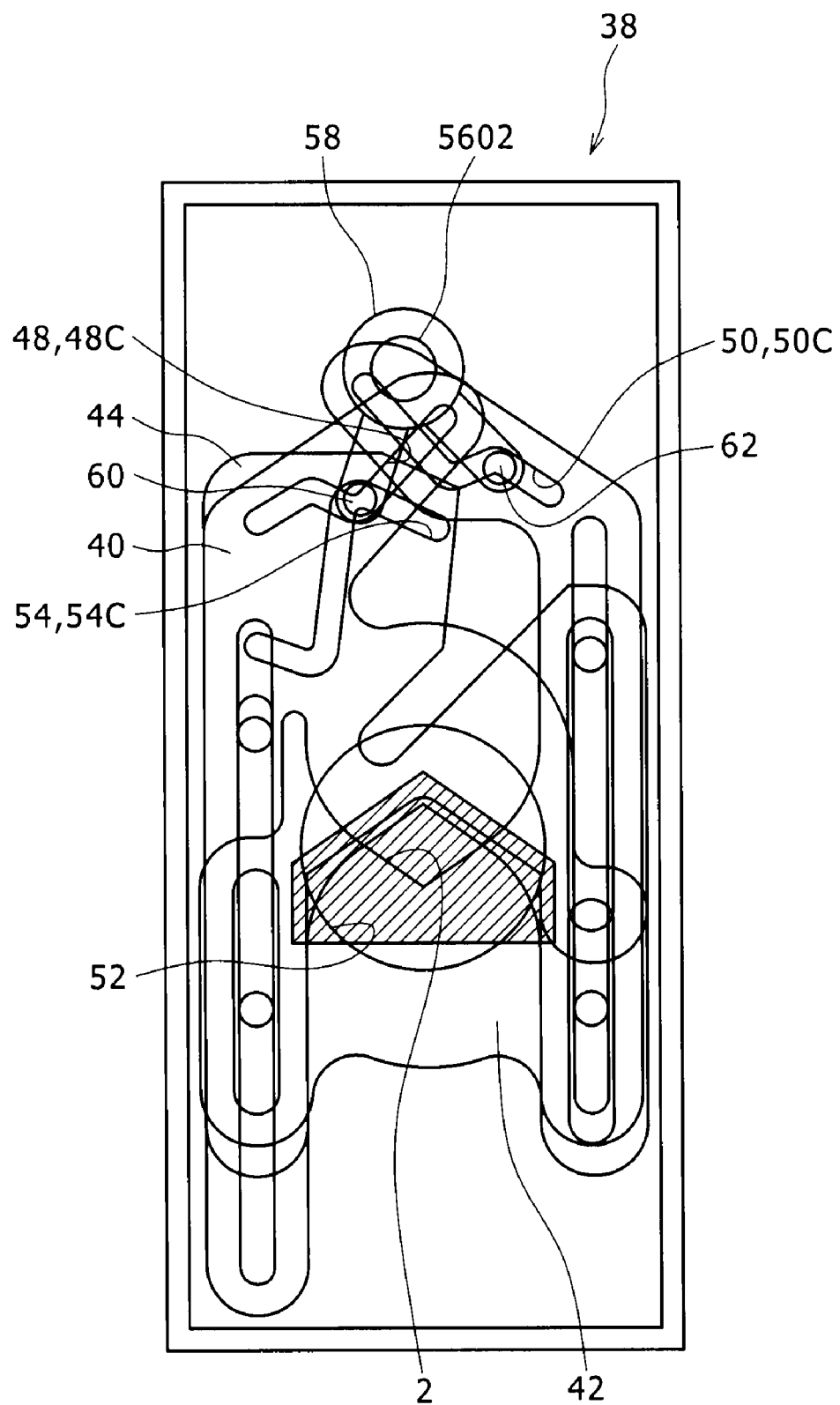
FIG. 13 is a plan view of the light quantity adjusting device in which the diaphragm aperture is slightly closed and the ND filter blade is located at the use position.
Figure 14:
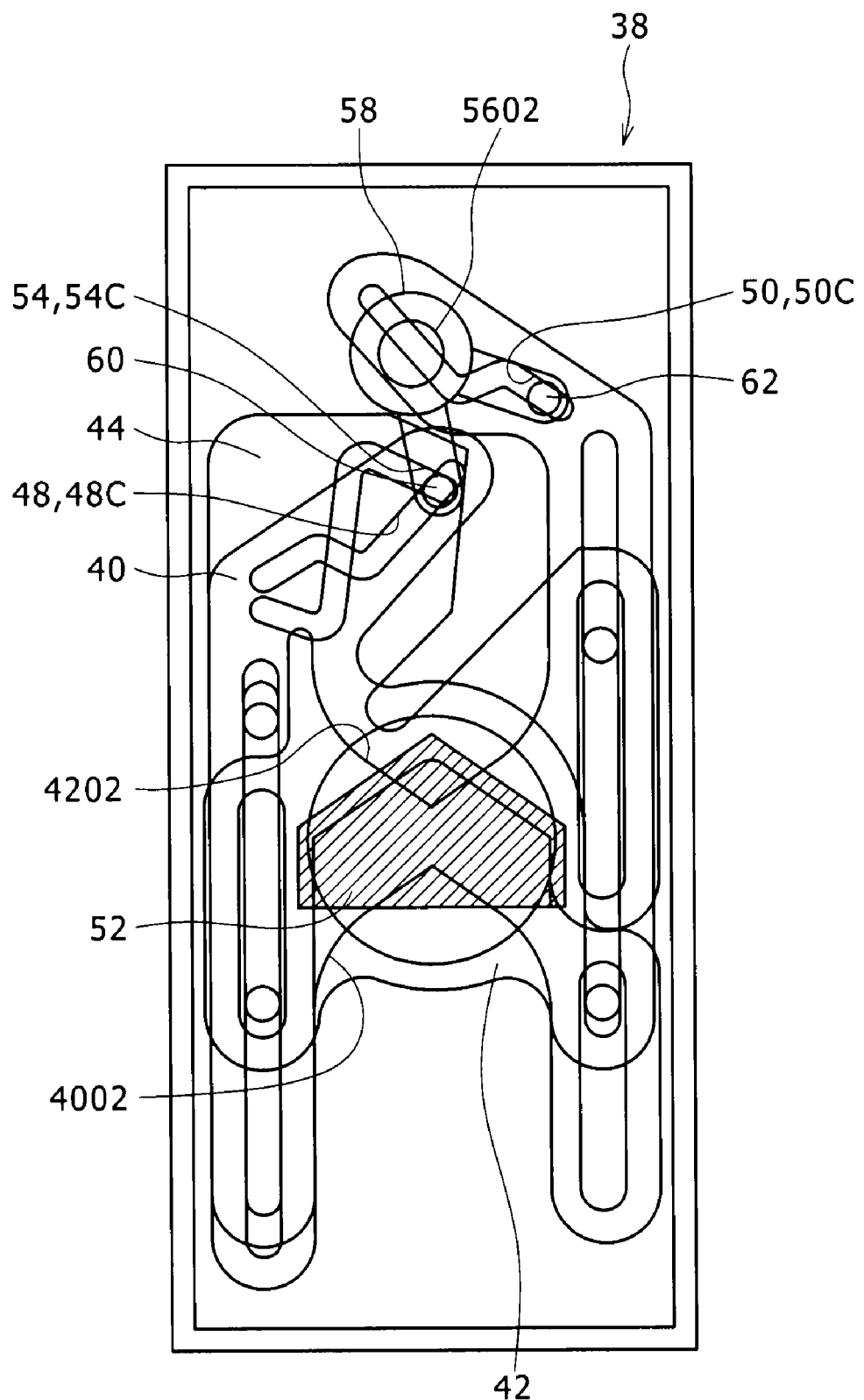
FIG. 14 is a plan view of the light quantity adjusting device in which the diaphragm aperture is fully closed and the ND filter blade is located at the use position.

FIG. 10 is a plan view of the light quantity adjusting device 38 in which a diaphragm aperture 2 is opened and an ND filter blade 44 is located at a withdrawal position. FIG. 11 is a plan view of the light quantity adjusting device 38 in which the diaphragm aperture 2 is halfway closed and the ND filter blade 44 is located at a withdrawal position. FIG. 12 is a plan view of the light quantity adjusting device 38 in which the diaphragm aperture 2 is halfway closed and the ND filter blade 44 is located at a use position. FIG. 13 is a plan view of the light quantity adjusting device 38 in which the diaphragm aperture 2 is slightly closed and the ND filter blade 44 is located at the use position. FIG. 14 is a plan view of the light quantity adjusting device 38 in which the diaphragm aperture 2 is fully closed and the ND filter blade 44 is located at the use position.

Incidentally, in FIG. 6, the shape of the third barrel divided body 36C is simplified and the illustration of the second fixed lens group 1812 and the like are omitted.

To simplify the illustration, FIGS. 10 through 14 illustrate merely the third barrel divided body 36C, a drive shaft 5602, an arm 58, first and second cam-pins 60, 62, first and second diaphragm blades 40, 42, and the ND filter blade 44. In addition, the shapes of the overlapping portions of the first and second diaphragm blades 40, 42 and the ND filter blade 44 are also indicated with solid lines.

The light quantity adjusting device 38 is configured to include the first and second diaphragm blades 40, 42, the ND filter blade 44 and a drive mechanism 46.

(First Diaphragm Blade 40)

Referring to FIGS. 6 and 7, the first diaphragm blade 40 cooperates with the second diaphragm blade 42 to form the diaphragm aperture 2 and to adjust the size of the diaphragm aperture 2.

The first diaphragm blade 40 is provided with an aperture-forming edge portion 4002 which forms one of the opposite edges of the diaphragm aperture 2.

The first diaphragm blade 40 is provided on both sides of the aperture-forming edge portion 4002 with two guide grooves 4004 by which the first diaphragm blade 40 is guided to be movable or shiftable linearly.

The first diaphragm blade 40 is provided at a position away from the aperture-forming edge portion 4002 and from the two guide grooves 4004 with a first cam groove 48 adapted to shift the first diaphragm blade 40.

The first cam groove 48 includes a first groove section 48A adapted to shift the first diaphragm blade 40; an intermediate groove section 48B connecting with an end of the first groove section 48A, extending on a circle around the drive shaft 5602 and adapted to retain the first diaphragm blade 40; and a second groove section 48C connecting with the intermediate groove section 48B and adapted to shift the first diaphragm blade 40.

The aperture-forming edge portion 4002 and the first cam groove 48 are spaced away from each other in the shifting direction of the first diaphragm blade 40, that is, in the extending direction of the guide groove 4004.

(Second Diaphragm Blade 42)

Referring to FIGS. 6 and 8, the second diaphragm blade 42 cooperates with the first diaphragm blade 40 to form the diaphragm aperture 2 and to adjust the size of the diaphragm aperture 2 (FIGS. 10 through 13).

The second diaphragm blade 42 is provided with an aperture-forming edge portion 4202 which forms the other of the opposite edges of the diaphragm aperture 2 inversely to the aperture-forming edge portion 4002 of the first diaphragm blade 40.

The second diaphragm blade 42 is provided on both sides of the aperture-forming edge portion with two guide grooves 4204 adapted to guide the second diaphragm blade 42 so as to be moveable linearly.

A second cam groove 50 is provided at a position away from the aperture-forming edge portion 4202 and from the two guide grooves 4204 so as to shift the second diaphragm blade 42.

The second cam groove 50 includes a first groove section 50A adapted to shift the second diaphragm blade 42; an intermediate groove section 50B connecting with an end of the first groove section 50A, extending on a circle around the drive shaft 5602 and adapted to retain the first diaphragm blade 40; and a second groove section 50C connecting with the intermediate groove section 50B and adapted to shift the second diaphragm blade 42.

The aperture-forming edge portion 4202 and the second cam groove 50 are spaced apart from each other in the shifting direction of the second diaphragm blade 42, that is, in the extending direction of the guide groove 4204.

(ND Filter Blade 44)

Referring to FIGS. 6 and 9, the ND filter blade 44 includes an ND filter 52 which covers the diaphragm aperture 2 to reduce the quantity of light passing through the diaphragm aperture 2.

The ND filter blade 44 is provided on both sides of the ND filter 52 with two guide grooves 4404 adapted to guide the ND filter blade 44 so as to be shiftable linearly in the same direction as the first and second diaphragm blades 40, 42.

The ND filter blade 44 is provided at a position away from the ND filter 52 and from the two guide grooves 4404 with a third cam groove 54 adapted to shift the ND filter blade 44.

The third cam groove 54 includes a withdrawal-position groove section 54A adapted to retain the ND filter blade 44 at a withdrawal position described later; an ND filter-shifting groove section 54B connecting with an end of the withdrawal-position groove section 54A and adapted to shift the ND filter blade 44; and a use-position groove section 54C connecting with the ND filter blade-shifting groove section 54B and adapted to retain the ND filter blade 44 at a use position described later.

The ND filter 52 and the third cam groove 54 are spaced apart from each other in the shifting direction of the ND filter blade 44, that is, in the extending direction of the guide groove 4404.

Incidentally, since the ND filter 52 is made of a synthetic resin, the ND filter blade 44 and the ND filter 52 can be made of a single material.

(Drive Mechanism 46)

As illustrated in FIG. 6, the drive mechanism 46 is configured to include an actuator 56, the first cam groove 48, the second cam groove 50, the third cam groove 54, an arm 58, a first cam-pin 60 and a second cam-pin 62.

The actuator 56 is composed of a meter including a drive shaft 5602, a magnet, not illustrated, connected to the drive shaft 5602, and a coil, not illustrated, provided to face the magnet.

The drive shaft 5602 is turned normally and reversely by a turning-drive force produced by magnetic interaction between a magnetic field produced by the supply of drive current to the coil and a magnetic field of the magnet.

The arm 58 is integrally turnably coupled to the drive shaft 5602. The arm 58 is pivoted integrally with the drive shaft 5602 by turning or pivoting the drive shaft 5602 in a defined angular range.

The arm 58 is provided with two arms, i.e., a first arm 58A and a second arm 58B.

The first cam-pin 60 is provided at the tip of the first arm 58A and engaged with both the first cam groove 48 and the third cam groove 54.

The second cam-pin 62 is provided at the tip of the second arm 58B and engaged with the second cam groove 50.

The first, second and third cam grooves 48, 50, 54 are configured such that the arm 58 is pivoted to shift the first and second diaphragm blades 40, 42 oppositely to each other by the arm 58 via the first and second cam-pins 60, 62 to thereby adjust the size of the diaphragm aperture 2.

The first, second and third cam grooves 48, 50, 54 are configured so that while the diaphragm aperture 2 is formed to have a predetermined size (to have a middle aperture state described later), the ND filter blade 44 is shifted between the use position where the ND filter 52 covers the diaphragm aperture 2 and the withdrawal position where the ND filter 52 withdraws from the diaphragm aperture 2.

In other words, the position where the ND filter 52 covers the diaphragm aperture 2 is the use position of the ND filter blade 44 and the position where the ND filter 52 withdraws from the diaphragm aperture 2 is the withdrawal position of the ND filter blade 44.

In the present embodiment as illustrated in FIG. 6, the first and second diaphragm blades 40, 42 and the ND filter blade 44 are arranged via the third barrel divided body 36C, a first holding plate 64 and a second holding plate 66.

The third barrel divided body 36C is formed with a notch 3610 adapted to permit the pivotal movement of the first and second arms 58A, 58B and with a window 3612 adapted to form the diaphragm aperture 2.

The third barrel divided body 36C is provided with a plurality of pins 3620 used to position the first and second holding plates 64, 66. These pins 3620 function as positioning pins for positioning the first and second holding plates 64, 66. In addition, they are inserted into the respective guide grooves 4004, 4204 and 4404 of the first and second diaphragm blades 40, 42 and the ND filter blade 44 to function as guide pins adapted to guide the first and second diaphragm blades 40, 42 and the ND filter blade 44 so as to be shiftable linearly.

The first holding plate 64 is formed with a positioning hole 6402 adapted to receive the pins 3620 inserted therethrough, with a notch 6410 adapted to permit the pivotal movement of the first and second cam-pins 60, 62, and a window 6412 adapted to form the diaphragm aperture 2.

The second holding plate 66 is formed with a positioning hole 6602 adapted to receive the pins 3620 inserted therethrough, with a notch 6610 adapted to permit the pivotal movement of the first and second cam-pins 60, 62, and a window 6612 adapted to form the diaphragm aperture 2.

The first holding plate 64 is attached to the third barrel divided body 36C via the pins 3620 and the ND filter blade 44 is disposed between the first holding plate 64 and the third barrel divided body 36C.

The first and second diaphragm blades 40, 42 are disposed on the first holding plate 64 via the pins 3620. In addition, the second holding plate 66 is disposed on the first diaphragm plate 40 with the pins 3620.

Further, the first barrel divided body 36A (FIG. 4) is disposed on the second holding plate 66. The first and second diaphragm blades 40, 42 and the ND filter blade 44 are arranged by the third barrel divided body 36C, and the first and second holding plates 64, 66 sandwiched between the first barrel divided body 36A and the third barrel divided body 36C.

Incidentally, symbol A denotes the shifting trajectory of the second cam-pin 62 in FIGS. 7 and 9 and symbol B denotes the shifting trajectory of the first cam-pin 60 in FIG. 8.

As illustrated in FIGS. 7 and 9, the first diaphragm blade 40 and the ND filter blade 44 are formed in an outer shape not interfering with the shifting trajectory of the second cam-pin 62. As illustrated in FIG. 8, the second diaphragm blade 42 is formed in an outer shape not interfering with the shifting trajectory of the first cam-pin 60.

Since the first and second diaphragm blades 40, 42 and the ND filter blade 44 are formed as described above, the light quantity adjusting device 38 can be assembled by simple work in which the first and second diaphragm blades 40, 42, and the ND filter blade 44 are sequentially dropped from above the first and second cam-pins 60, 62. This is advantageous to improve assembling performance.

(Explanation of Operation)

A more detailed description is given of the motion of the first and second diaphragm blades 40, 42 and of the ND filter blade 44.

Referring to FIG. 10, in the state where the first cam-pin 60 is located at an end of the first groove section 48A of the first cam groove 48 and at an end of the withdrawal-position groove portion 54A of the third cam groove 54, and the second cam-pin 62 is located at an end of the first groove section 50A of the second cam groove 50, the diaphragm aperture 2 is opened and the ND filter blade 44 is located at the withdrawal position where the ND filter 52 withdraws from the diaphragm aperture 2.

If the drive shaft 5602 is normally turned from this state, the first and second cam-pins 60, 62 are pivoted. Thus, the first cam-pin 60 is moved from the end of the first groove section 48A of the first cam groove 48 to the intermediate groove section 48B. In addition, the first cam-pin 60 is moved from the end of the withdrawal-position groove section 54A of the third cam groove 54 to the ND filter blade-shifting groove section 54B. Further, the second cam-pin 62 is moved from the withdrawal-position groove section 54A to the ND filter-shifting groove section 54B.

The pivotal movement of the first and second cam-pins 60, 62 causes the first and second diaphragm blades 40, 42 to linearly shift reversely to each other to gradually reduce the aperture area of the diaphragm aperture 2 compared with that of the fully-opened state thereof.

As illustrated in FIG. 11, then, the first cam-pin 60 is located at an end of the intermediate groove section 48B of the first cam groove 48 and at an end of the ND filter blade-shifting groove section 54B of the third cam groove 54, and the second cam-pin 62 is located at an end of the intermediate groove section 50B of the second cam groove 50.

In this state, the diaphragm aperture 2 is brought into a middle aperture state where its aperture area is smaller than that in the fully-opened state. While the ND filter 52 is shifted in the direction close to the diaphragm aperture 2, the ND filter blade 44 is located at the withdrawal position where the ND filter 52 withdraws from the halfway closed diaphragm aperture 2.

If the drive shaft 5602 is further normally turned, the first cam-pin 60 is located at the other end from the one end of the intermediate groove section 48B of the first cam groove 48 and at the other end from the one end of the ND filter blade-shifting groove section 54B of the third cam groove 54. In addition, the second cam-pin 62 is located at the other end from the one end of the intermediate groove section of the second cam groove 50.

As illustrated in FIG. 12, the respective intermediate groove sections 48B and 50B of the first and second cam grooves 48 and 50 are located on the same circle around the drive shaft 5602. Therefore, the first and second diaphragm blades 40, 42 stay at a position providing the middle aperture state but only the ND filter blade 44 is linearly shifted and reaches the use position where the ND filter 52 covers the diaphragm aperture 2.

In short, the ND filter blade 44 is shifted from the withdrawal position to the use position. Thus, not only the ND filter blade 44 will not stay at an intermediate position between the withdrawal position and the use position but also the ND filter 52 will not stay at a position where the ND filter 52 covers part of the diaphragm aperture 2.

If the drive shaft 5602 is further normally turned, the first cam-pin 60 is shifted from the other end of the intermediate groove section 48B of the first cam groove 48 toward the second groove section 48C and from the other end of the ND filter-shifting groove section 54B of the third cam groove 54 toward the use-position groove section 54C. In addition, the second cam-pin 62 is shifted from the other end of the intermediate groove section 50B of the second cam groove 50 toward the second groove section 50C.

Along with such movements, the first and second diaphragm blades 40, 42 are linearly shifted reversely to each other so that the diaphragm aperture 2 is gradually reduced in aperture area than in the middle aperture state.

As illustrated in FIG. 13, then, the first cam-pin 60 is located at one end of the second groove section 48C of the first cam groove 48 and at one end of the use-position groove portion 54C of the third cam groove 54. In addition, the second cam-pin 62 is located at one end of the second groove section 50C of the second cam-pin groove 50. Thus, the diaphragm aperture 2 is brought into a small aperture state where its aperture area is smaller than that in the middle aperture state, and the ND filter blade 44 stays at the use position.

If the drive shaft 5602 is further normally turned, the first cam-pin 60 is shifted toward the other end of the second groove section 48C of the first cam groove 48 and toward the other end of the use-position groove section 54C of the third cam groove 54, and the second cam-pin 62 is shifted toward the other end of the second groove section 50C of the second cam groove 50.

As illustrated in FIG. 14, then, the first cam-pin 60 is located at the other end of the second groove section 48C of the first cam groove 48 and at the other end of the use-position groove section 54C of the third cam groove 54. In addition, the second cam-pin 62 is located at the other end of the second groove section 50C of the second cam groove 50. In this state, the diaphragm aperture 2 is brought into the fully closed state and the ND filter blade 44 stays at the use position.

In this way, the diaphragm aperture 2 is brought into the fully closed state by the first and second diaphragm blades 40, 42, and thus, a mechanical shutter is configured.

Incidentally, if the drive shaft 5602 is reversely turned, the reverse operation to the above is performed through the first and second cam-pins 60, 62 and the first, second and third cam grooves 48, 50, 54.

Thus, if the reverse turning of the drive shaft 5602 shifts the ND filter blade 44 from the use position to the withdrawal position, only the ND filter blade 44 is linearly shifted to the withdrawal position while the first and second diaphragm blades 40, 42 stay at the position providing the middle aperture state.

(Effect)

According to the present embodiment described above, the shifting direction of the first and second diaphragm blades 40, 42 adapted to adjust the size of the diaphragm aperture 2 is the same as that of the ND filter blade 44 adapted to reduce the quantity of light passing through the diaphragm aperture 2. In addition, the first and second diaphragm blades 40, 42 and the ND filter blade 44 are shifted through the first and second cam-pins 60, 62 pivoted by the actuator 56 and through the first, second and third cam grooves 48, 50, 54.

In this way, the space occupied by the first and second diaphragm blades 40, 42 can be made to overlap the space occupied by the ND filter blade 44. In addition, merely one actuator 56 is desired to shift the first and second filter blades 40, 42 and the ND filter blade 44. This is advantageous to reduce the occupancy space of the light quantity adjusting device 38 and thus, this is advantageous to reduce the size and thickness of the lens barrel 14 and of the image pickup apparatus 10.

In the state where the diaphragm aperture 2 is formed into a predetermined size, the ND filter blade 44 is shifted to the use position covering the diaphragm aperture 2 and to the withdrawal position withdrawn from the diaphragm aperture 2, that is, will not stay at the position covering part of the diaphragm aperture 2. Thus, the diaphragm aperture 2 is not brought into the halfway-covered state where it is partially covered by the ND filter 52. This is advantageous to improve resolution capability.

Incidentally, the present embodiment has described the following. If the drive shaft 5602 is normally turned, only the ND filter blade 44 is linearly shifted to reach the use position where the ND filter 52 covers the diaphragm aperture 2, while the first and second diaphragm blades 40, 42 stay at the position providing the middle aperture state. On the other hand, if the drive shaft 5602 is reversely turned, only the ND filter blade 44 is linearly shifted to reach the withdrawal position where the ND filter 52 is withdrawn from the diaphragm aperture 2, while the first and second diaphragm blades 40, 42 stay at the position providing the middle aperture state.

However, while the first and second diaphragm blades 40, 42 is slightly shifted in the middle aperture state, the ND filter blade 44 may be shifted to the use position where the ND filter 52 covers the diaphragm aperture 2 and to the withdrawal position where it is withdrawn from the diaphragm aperture 2. In other words, while the first and second diaphragm blades 40, 42 substantially provide the middle aperture state, the ND filter blade 44 may be shifted to the use position and to the withdrawal position. Specifically, the traveling speed at which the ND filter blade 44 is shifted to the use position or to the withdrawal position is desired merely to be set at least three times that of the first and second diaphragm blades 40, 42.

In the present embodiment, when the ND filter blade 44 is shifted from the withdrawal position to the use position or vice versa, the ND filter blade 44 does not stay at the intermediate position between the withdrawal position and the use position; therefore, the ND filter 52 will not stay at the position covering part of the diaphragm aperture 2.

Thus, the quantity of incident light attenuated by the ND filter 52 is equal to zero at the withdrawal position of the ND filter blade 44. In addition, the quantity of incident light is attenuated depending on the transmissivity of the ND filter 52 at the use position of the ND filter blade 44.

Because of this, the quantity of incident light is abruptly varied by the light quantity adjusting device 38 between the withdrawal position and use position of the ND filter blade 44; therefore, an exposure amount is abruptly varied. This is disadvantageous to smooth exposure control.

The smooth exposure control can be achieved by exercising the control as below by the function of an electronic shutter using the image pickup element 16.

Specifically, concurrently with the shifting of the ND filter blade 44 to the use position from the withdrawal position, control is exercised to reduce the shutter speed of the electronic shutter by a speed component enough to cancel the variation in the transmissive amount of light due to the presence or absence of the ND filter 52 (control to increase shutter-opened time).

Alternatively, concurrently with the shifting of the ND filter blade 44 to the withdrawal position from the use position, control is exercised to increase the shutter speed of the electronic shutter by a speed component enough to cancel the variation in the transmissive amount of light due to the presence or absence of the ND filter 52 (control to reduce shutter-opened time).

Thereafter, the electronic shutter speed is continuously varied to smoothly vary the exposure amount, thus allowing for smooth exposure control.

Incidentally, needless to say, the electronic shutter speed control described above can be exercised by the control section 30 controlling the image pickup element 16 and the driver 2608 via the timing generator 2610 as illustrated in FIG. 5.

In the present embodiment the mechanical shutter is configured by the first and second diaphragm blades 40, 42 providing the fully closed state of the diaphragm aperture 2; however, it is arbitrary that the first and second diaphragm blades 40, 42 provide or do not provide the fully closed state of the diaphragm aperture 2. However, if the mechanical shutter is configured by providing the fully closed state of the diaphragm aperture 2 as in the present embodiment, a combination of the mechanical shutter function with the electronic shutter function of the image pickup element 16 can advantageously achieve various shutter operations.

Incidentally, the present embodiment describes the case where the image pickup apparatus is a digital still camera; however, the present invention can widely be applied to image pickup apparatuses such as camera-equipped cell-phones, video cameras, and security cameras.

Additionally, the present embodiment describes the case where the light quantity adjusting device is applied to the image pickup apparatus; however, the present invention is not limited to this. For example, the light amount adjusting device according to the embodiment of the invention can arbitrarily be used as a light quantity adjusting device of a light source for a projector device.

The present application contains subject matter related to that disclosed in Japanese Priority Patent Application JP 2008-140598 filed in the Japan Patent Office on May 29, 2008, the entire content of which is hereby incorporated by reference.

It should be understood by those skilled in the art that various modifications, combinations, sub-combinations and alterations may occur depending on design requirements and other factor in so far as they are within the scope of the appended claims or the equivalents thereof.

What is claimed is:

1. A light quantity adjusting device comprising:
   first and second diaphragm blades shiftably provided to adjust a size of a diaphragm aperture;
   a neutral density filter blade provided shiftably in the same direction as the first and second diaphragm blades and having a neutral density filter adapted to cover the diaphragm aperture to reduce a quantity of light passing through the diaphragm aperture; and
   a drive mechanism adapted to shift the first and second blades and the neutral density filter blade;
   wherein
   the drive mechanism is configured to include
      an actuator,
      a first cam groove formed in the first diaphragm blade,
      a second cam groove formed in the second diaphragm blade,
      a third cam groove formed in the neutral density filter blade,
      an arm pivoted by the actuator,
      a first cam-pin provided on the arm so as to project therefrom and engage both the first and third cam grooves, and
      a second cam-pin provided on the arm so as to project therefrom and engage the second cam groove, and
      the first, second and third cam grooves are formed such that the arm is pivoted to shift, via the first and second cam-pins, the first and second diaphragm blades oppositely to each other to adjust the size of the diaphragm aperture and such that in a state where the aperture diaphragm is formed at a predetermined size, the neutral density filter blade is shifted between a use position where the neutral density filter covers the diaphragm aperture and a withdrawal position where the neutral density filter is withdrawn from the diaphragm aperture.

2. The light quantity adjusting device according to claim 1, wherein
   the state where the aperture diaphragm is formed at a predetermined size is a middle aperture state where the diaphragm has an intermediate size,
   each of the first and second cam grooves has an intermediate groove section extending on a circle around a pivotal center of the arm,
   the third cam groove includes a withdrawal-position groove section, a neutral density filter blade-shifting groove section connecting with the withdrawal-position groove section, and a use-position groove section connecting with the neutral density filter blade-shifting groove section,
   in a state where the first and second cam-pins are located at the intermediate groove sections of the first and second cam grooves, respectively, the diaphragm aperture comes into the middle aperture state, and
   while the first and second cam pins are located at the intermediate groove sections of the first and second cam grooves, respectively, the neutral density filter blade is shifted between the use position and the withdrawal position via the first cam-pin and via the neutral density filter blade-shifting groove section.

3. The light quantity adjusting device according to claim 1, wherein
the first diaphragm blade has an edge portion edging one of opposite edges of the diaphragm aperture,
the second diaphragm blade has an edge portion edging the other of the opposite edges of the diaphragm aperture,
the edge portion of the first diaphragm blade and the first cam groove are spaced apart from each other in the shifting direction of the first diaphragm blade,
the edge portion of the second diaphragm blade and the second cam groove are spaced apart from each other in the shifting direction of the second diaphragm blade, and
the neutral density filter of the neutral density filter blade and the third cam groove are spaced apart from each other in the shifting direction of the neutral density filter blade.

4. The light quantity adjusting device according to claim 1, wherein the diaphragm aperture is adjusted in size between an opened state where an aperture area is largest and a fully closed state where the aperture area is equal to zero.

5. A lens barrel equipped with a light quantity adjusting device, the light quantity adjusting device comprising:
first and second diaphragm blades shiftably provided to adjust a size of a diaphragm aperture;
a neutral density filter blade provided shiftably in the same direction as the first and second diaphragm blades and having a neutral density filter adapted to cover the diaphragm aperture to reduce a quantity of light passing through the diaphragm aperture; and
a drive mechanism adapted to shift the first and second blades and the neutral density filter blade; wherein
the drive mechanism is configured to include
an actuator,
a first cam groove formed in the first diaphragm blade,
a second cam groove formed in the second diaphragm blade,
a third cam groove formed in the neutral density filter blade,
an arm pivoted by the actuator,
a first cam-pin provided on the arm so as to project therefrom and engage both the first and third cam grooves, and
a second cam-pin provided on the arm so as to project therefrom and engage the second cam groove, and
the first, second and third cam grooves are formed such that the arm is pivoted to shift, via the first and second cam-pins, the first and second diaphragm blades oppositely to each other to adjust the size of the diaphragm aperture and such that in a state where the aperture diaphragm is formed at a predetermined size, the neutral density filter blade is shifted between a use position where the neutral density filter covers the diaphragm aperture and a withdrawal position where the neutral density filter is withdrawn from the diaphragm aperture.

6. An image pickup apparatus equipped with a light quantity adjusting device, the light quantity adjusting device comprising:
first and second diaphragm blades shiftably provided to adjust a size of a diaphragm aperture;
a neutral density filter blade provided shiftably in the same direction as the first and second diaphragm blades and having a neutral density filter adapted to cover the diaphragm aperture to reduce a quantity of light passing through the diaphragm aperture; and
a drive mechanism adapted to shift the first and second blades and the neutral density filter blade;
wherein the drive mechanism is configured to include
an actuator,
a first cam groove formed in the first diaphragm blade,
a second cam groove formed in the second diaphragm blade,
a third cam groove formed in the neutral density filter blade,
an arm pivoted by the actuator,
a first cam-pin provided on the arm so as to project therefrom and engage both the first and third cam grooves, and
a second cam-pin provided on the arm so as to project therefrom and engage the second cam groove, and
the first, second and third cam grooves are formed such that the arm is pivoted to shift, via the first and second cam-pins, the first and second diaphragm blades oppositely to each other to adjust the size of the diaphragm aperture and such that in a state where the aperture diaphragm is formed at a predetermined size, the neutral density filter blade is shifted between a use position where the neutral density filter covers the diaphragm aperture and a withdrawal position where the neutral density filter is withdrawn from the diaphragm aperture.

* * * * *